June 18, 1963 A. EISELE 3,093,909
PRECISION BORE GAUGE
Filed June 9, 1960
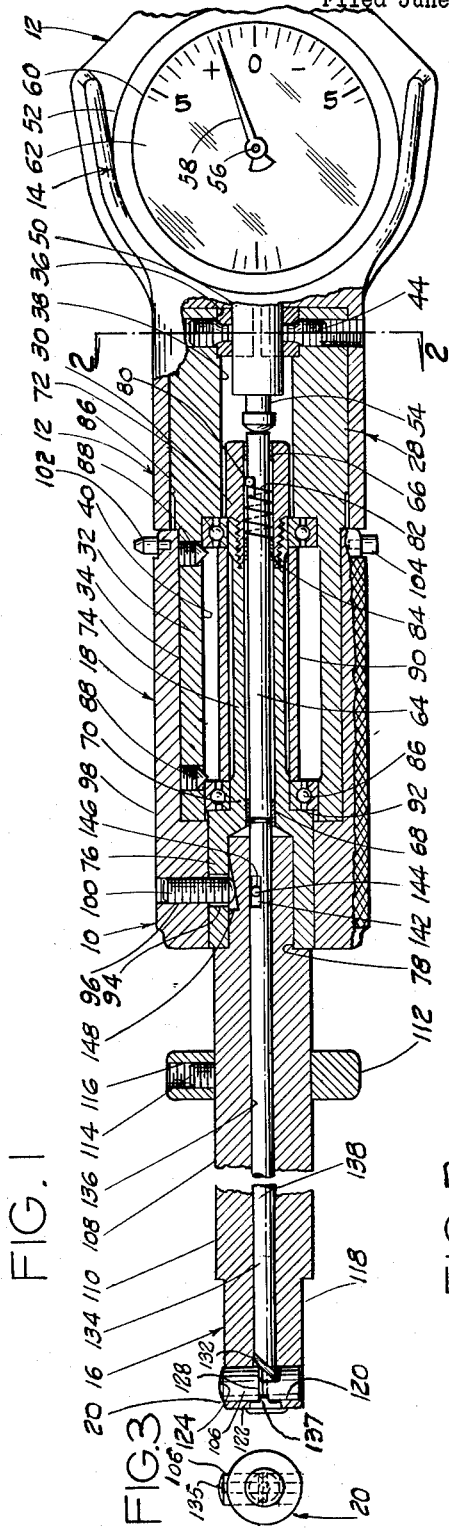
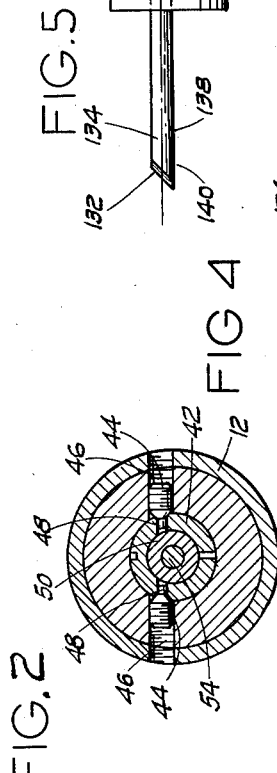
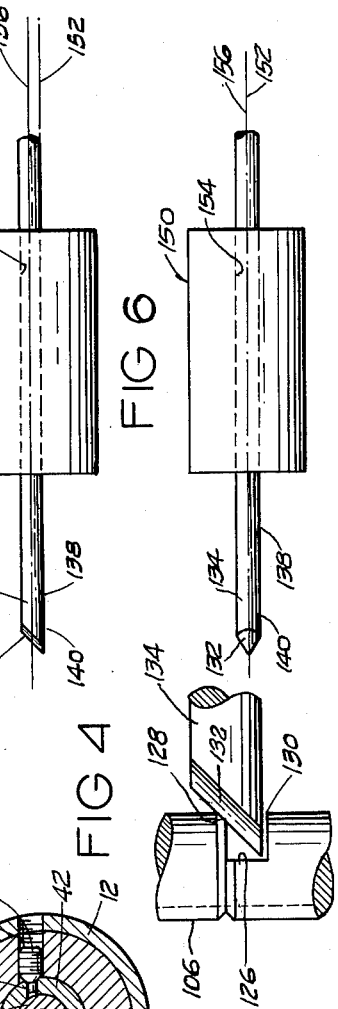
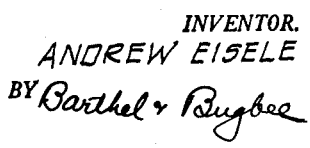
INVENTOR.
ANDREW EISELE
BY Barthel & Bugbee

United States Patent Office 3,093,909
Patented June 18, 1963

3,093,909
PRECISION BORE GAUGE
Andrew Eisele, 459 Belton Ave., Garden City, Mich.
Filed June 9, 1960, Ser. No. 34,906
7 Claims. (Cl. 33—178)

This invention relates to bore gauges and, in particular, to bore concentricity gauges for measuring the concentricity of one bore relatively to another adjacent bore.

One object of this invention is to provide an improved bore concentricity gauge which has a greater ease of action than prior bore concentricity gauges, due to an improvement in the mechanism within the measuring head of the instrument adjacent the measuring pin or "feeler."

Another object is to provide a bore concentricity gauge of the foregoing character wherein the transverse motion of the measuring pin or feeler is converted to longitudinal motion of a motion-transmitting rod by engagement of an edge portion of the feeler with an inclined end of the motion-transmitting rod, the angle between the axes of motion of the measuring pin and motion-transmitting rod deviating slightly from mutual perpendicularity in order to cause easier motion of these parts in response to a lighter force than hitherto in such gauges.

Another object is to provide a bore concentricity gauge of the foregoing character wherein the lightness of operation and accuracy of the gauge are enhanced by the presence of a transversely curved surface of approximately conical shape on the beveled end of the motion-transmitting rod where it engages the edge of the measuring pin or feeler.

Another object is to provide a bore concentricity gauge of the foregoing character wherein the contact edge of the feeler is provided with a tiny beveled surface of approximately 45 degrees located in a notch intermediate the opposite ends of the measuring pin or feeler, thereby eliminating the tendency of the inclined end of the motion-transmitting rod to tilt or "cock" the feeler, as in prior gauges lacking this construction.

Another object is to provide a bore concentricity gauge of the foregoing character wherein the measuring pin or feeler is provided with a longitudinal groove the walls of which are engaged by an axial pin mounted in the end of the stem of the instrument for preventing turning of the measuring pin or feeler within its transverse bore in the stem.

Other objects and advantages of the invention will become apparent during the course of the following description of the accompanying drawings, where:

FIGURE 1 is a central longitudinal section, partly in side elevation, through an improved bore concentricity gauge, according to one form of the invention;

FIGURE 2 is a cross section taken along the line 2—2 in FIGURE 1, showing the arrangement for clamping the stem of the dial indicator to the remainder of the instrument;

FIGURE 3 is a left-hand end elevation of the instrument of FIGURE 1, showing the measuring head;

FIGURE 4 is an enlarged fragmentary side elevation of the left-hand end portion of FIGURE 1, showing the slight bevel on the notch edge of the measuring pin engaged by the curved inclined end of the motion-transmitting rod;

FIGURE 5 is a side elevation of the motion-transmitting rod in a grinding fixture for producing the inclined transversely curved end thereon; and FIGURE 6 is a top plan view of the assembly shown in FIGURE 5.

Referring to the drawing in detail, FIGURE 1 shows a bore concentricity gauge, generally designated 10, according to one form of the invention as consisting generally of a stationary dial indicator holder 12 having a conventional dial indicator 14 mounted thereon. Motion is transmitted from any one of a set of bore concentricity measuring units 16 at the forward end of the gauge 10 through a rotary measurement indicating holder, generally designated 18, in which the bore measuring units 16 are removably mounted. The bore measuring units 16 have measuring heads 20 which are insertable in a bore beyond a counterbore of a workpiece, the concentricity of which is to be measured.

The dial indicator holder 12 fits over a tubular stationary handle 28 having a cylindrical external surface 30 and provided with a tubular extension 32 with a cylindrical surface 34 of slightly smaller diameter than the external surface 30. Extending through the handle 28 and its extension 32 is a counterbore 36, bore 38 and extension bore 40 of larger internal diameter than the bore 38 (FIGURE 1).

Mounted snugly in the counterbore 36 at the rearward end of the handle 28 is a split clamping collar 42 held in place by set screws 44 (FIGURE 2) threaded from opposite directions into aligned almost tangential threaded bores 46 and engaging countersinks 48 in the opposite sides of the split collar 42, so as to compress the latter around the stem 50 of the dial indicator 14. The dial indicator 14, as stated above, is conventional and its details are beyond the scope of the present invention, such dial indicators being available on the open market and well-known to workers in the mechanical arts.

The dial indicator 14 has a casing 52 containing conventional motion-magnifying mechanism connecting its plunger 54 (FIGURE 1) to its needle shaft 56 carrying the needle 58 which registers with graduations 60 upon a dial 62 located within the casing 52. The graduations 60 are in any suitable dimensions such as thousandths of an inch.

The dial indicator plunger 54 extends into the bore 38 and is round-ended for engagement with the rearward end of a reciprocable rearward motion-transmitting member 64. The latter is reciprocably mounted at its opposite ends in bearings 66 and 68 respectively mounted in a tubular barrel 70 and tubular plug 72 threaded into the rearward end of the reduced diameter portion 74 of the barrel 70, the latter having an enlarged tubular forward end portion 76 containing a counterbore or socket 78 for receiving the bore concentricity measuring units 16, as described below. The rearward motion-transmitting rod or member 64 is notched to receive a rotation-preventing pin 80 which also serves as an abutment for the rearward end of a compression spring 82, the forward end of which abuts the intermediate slide bearing 84 mounted in the reduced diameter portion 74 of the barrel 70.

Mounted on the outside of the reduced diameter portion 74 of the tubular barrel 70 (FIGURE 1) which is suitably relieved for the greater part of its length, are the inner races of a pair of axially spaced anti-friction bearings 86, such as ball bearings, the outer races of which are mounted in the bore 40 of the stationary handle extension 32 and held in place by pointed set screws 88. The tubular threaded plug 72 retains the inner race of the rearward bearing 86 in position, whereas the inner race of the opposite or forward bearing 86 is held in position by a tubular spacer 90 disposed between the inner races of the bearings 86. The inner race of the forwad anti-friction bearing 86 rests against the shoulder 92 between the enlarged forward end portion 76 and reduced diameter portion 74 of the tubular barrel 70. The end portion 76 is provided with an enlarged radial hole 94 which registers with a smaller diameter threaded radial bore 96 in the rotary tubular handle member 98 of the rotary measurement indicating holder 18.

Threaded into the bore 96 and through the enlarged hole 94 is a round-ended headless set screw 100, the lower end of which extends into the counterbore or socket 78 to engage the particular measuring unit 16 inserted therein. The rotary measurement indicating holder 18 and the measuring unit 16 which it contains are thus rotatably mounted upon the tubular extension 32 of the tubular stationary handle 28 and the rotary tubular handle member 98 at its rearward end is drilled at diametrically opposite locations to receive a pair of pointer pins 102 and 104 respectively, the former being pointed and the latter blunt to distinguish between them for showing the operator the precise location of the feeler or measuring pin 106 mounted in the measuring unit 16 with its axis parallel to and in the same longitudinal axial plane with the center lines of the pointer pins 102 and 104.

Each bore concentricity measuring unit 16 consists of a hollow shaft 108 having a cylindrical external surface 110 upon which is adjustably mounted a stop collar 112 locked in position by a set screw 114 threaded into a radial threaded bore 116 therein. The forward end of the hollow shaft 108 includes the measuring head 20 which consists of a reduced diameter shaft portion 118 provided with a smooth diametral transverse bore 120 extending therethrough near the forward end 122 thereof and slidably or reciprocably receiving the measuring pin or feeler 106. The latter has a rounded outer end 124 adapted to engage the wall of the bore to be checked when the hollow shaft 108 is pushed into the counterbore adjacent it with the cylindrical shaft surface 110 snugly engaging the wall of the counterbore.

Intermediate its opposite ends, the feeler or measuring pin 106 is provided with a diametral recess or notch 126 having opposite edges 128 and 130. The edge 128 is beveled at an angle of about forty-five degrees to the axis of the pin 106. Engageable with the beveled edge 128 is the inclined transversely curved tip 132 of a reciprocable forward motion-transmitting rod or member 134 which is snugly but reciprocably mounted in an axial bore 136 within the hollow shaft 108. The measuring pin 106 is grooved longitudinally at 135 to receive the end of a headed pin 137 for preventing rotation of the pin 106 in its bore 120.

The axis of the transverse bore 120 containing the measuring pin 106 is not exactly perpendicular to the axis of the longitudinal bore 136 containing the forward motion-transmitting rod 134, but is tilted at a slight angle of approximately three degrees to such a perpendicular line. In other words, the axis of the transverse measuring pin bore 120 at the end adjacent the rounded end 124 of the measuring pin 106 subtends an angle of about 93 degrees with the axis of the motion-transmitting rod bore 136. The inclined transversely curved tip 132 of the motion-transmitting rod 134 on the other hand, subtends an angle of about 47 degrees with the axis of the motion-transmitting rod 134. The transverse curvature of the tip 132 consists of a portion of a conical surface, the axis of which coincides with the cylindrical outer surface 138 of the motion-transmitting rod 134 (FIGURE 5) at the bottom or forward end of the inclined tip 132. This is accomplished in the manner of grinding the inclined tip 132, as described below.

The rearward end of the forward motion-transmitting rod or member 134 is rounded for engagement with the forward end of the rearward motion-transmitting rod or member 64. Near its rearward end, the forward motion-transmitting rod or member 134 is provided with a flat-bottomed notch 142 which is engaged by a rotation-preventing pin 144 pressed into a hole 146 in the hollow shaft 108 near its rearward end. The hollow shaft 108 is provided with an inclined-bottomed notch 148 disposed in line with the holes 94 and 96 and engaged by the inner end of the set screw 100 for clamping thereby in the socket 78.

The motion-transmitting rod 134 is ground with its inclined transversely curved tip 132 in the fixture, generally designated 150, shown in FIGURES 5 and 6. The fixture 150 is in the form of a cylinder having a central axis 152 and a decentered bore 154 of substantially the same diameter as the motion-transmitting rod 134 and snugly receiving the rod 134. The central axis 156 of the bore 154 is located with a decentration from the fixture axis 152 equal to the radius of the motion-transmitting rod 134 so that the surface 138 intersects the fixture axis 152 (FIGURE 5).

In grinding the inclined transversely curved tip 132, the fixture 150 containing the rod 134 (clamped in position by a set screw or other suitable means not shown) is mounted in a chuck or collet in the grinding machine and the grinding wheel of the latter adjusted to give the desired angle of inclination to the tip 132. When the chuck or collet containing the fixture 150 and rod 134 are rotated during grinding, a portion of a conical surface the axis of which coincides with the axis 152 of the fixture 150, is generated upon the tip 132 of the rod 134.

In the operation of the bore concentricity gauge 10 of FIGURES 1 to 4, let it be assumed that a bore concentricity measuring unit 16 with a measuring head 20 and external diameter 110 suitable for the particular bore and adjacent counterbore to be measured has been inserted in the socket 78 and clamped by means of the set screw 100, as shown in FIGURE 1. Let it also be assumed that the needle 58 of the dial indicator 14 has been adjusted to zero on the graduations 60 when the rounded end 124 of the measuring pin 120 is in engagement with the bore 22. This is done by loosening the set screws 44 and moving the dial indicator stem 50 back and forth until the zero reading is obtained, after which the set screws 44 are tightened to constrict the split clamping ring 42 when the needle 58 registers with zero on the graduations 60.

To measure the concentricity of the bore and adjacent counterbore, the user inserts the forward end of the measuring unit 16 into the counterbore with the measuring head 20 entering the bore. He then holds the stationary handle 30 against rotation in one hand while he rotates the rotary measurement indicating holder 18 by grasping the rotary handle 98 in the other hand and turning it. As the latter is turned, any deviations from concentricity of the bore relatively to the counterbore will be made evident by a shifting of the needle 58 off zero and a swinging of it to and fro as rotation of the measuring head 20 is carried out. The pointed pointer pin 102 indicates to the user where the rounded end 124 of the measuring pin or feeler 106 is located at any given instant relatively to the bore, with the result that the location of any deviation from concentricity or any irregularity in the bore can be instantly and precisely determined. The measuring pin 106 moves back and forth as it engages the wall of the bore, its beveled edge 128 pushing against the inclined transversely curved tip 132 which consequently reciprocates the rods 134 and 64 and the plunger 54 of the dial indicator 14.

The foregoing operation is facilitated by the fact that the measuring pin 106 subtends an angle slightly greater than a right angle with the axis of the motion-transmitting rod 134, together with the coaction of the inclined transversely curved tip 132 with the beveled edge 128 of the notch 126. This removes or at least minimizes the tendency to tilt the measuring pin which occurs when the measuring pin and motion-transmitting rod have their axes disposed exactly perpendicular to one another.

What I claim is:

1. A precision bore gauge comprising a hollow support, a dial indicator mounted on said support, an elongated hollow stem connected to said support, said stem having therein a longitudinal bore and a transverse bore disposed remote from said dial indicator in communication with said longitudinal bore, a transversely reciprocable measuring member reciprocably mounted in said transverse bore and having a feeler portion thereon adapted to contact the wall of a workpiece bore to be measured, said measuring member in spaced relationship with one of its ends having a peripheral contact edge inclined relatively to the axis of said measuring member, and motion-transmitting mechanism including an elongated motion-transmitting member reciprocably mounted in said longitudinal bore and having a contact portion inclined obliquely to the axis of said motion-transmitting member and engageable with said contact edge.

2. A precision bore gauge, according to claim 1, wherein said measuring member has a recess therein intermediate its opposite ends and wherein said contact edge comprises a beveled peripheral edge of said recess.

3. A precision bore gauge, according to claim 1, wherein said contact portion of said motion-transmitting member consists of an inclined transversely curved surface on the end of said motion-transmitting member.

4. A precision bore gauge, according to claim 3, wherein said transversely curved surface is a portion of a conical surface having its axis substantially coinciding with a side surface of said motion-transmitting member.

5. A precision bore gauge comprising a hollow support, a dial indicator mounted on said support, an elongated hollow stem connected to said support, said stem having therein a longitudinal bore and a transverse bore disposed remote from said dial indicator in communication with said longitudinal bore, a transversely reciprocable measuring member reciprocably mounted in said transverse bore and having a feeler portion thereon adapted to contact the wall of a workpiece bore to be measured, said measuring member in spaced relationship with one of its ends having a contact edge, and motion-transmitting mechanism including an elongated motion-transmitting member reciprocably mounted in said longitudinal bore and having a contact portion inclined obliquely to the axis of said motion-transmitting member and engageable with said contact edge, the axis of said measuring member being disposed at an angle greater than a right angle relatively to the axis of said motion-transmitting member.

6. A precision bore gauge, according to claim 5, wherein said contact portion of said motion-transmitting member consists of an inclined transversely curved surface on the end of said motion-transmitting member.

7. A precision bore gauge, according to claim 6, wherein said surface is a portion of a conical surface having its axis substantially coinciding with a side surface of said motion-transmitting member.

References Cited in the file of this patent

UNITED STATES PATENTS

| | | |
|---|---|---|
| 2,799,092 | Abramson | July 16, 1957 |
| 2,910,781 | Bishop | Nov. 3, 1959 |
| 2,956,342 | Eisele | Oct. 18, 1960 |